United States Patent [19]

Natarajan et al.

[11] Patent Number: 5,274,841
[45] Date of Patent: Dec. 28, 1993

[54] METHODS FOR POLLING MOBILE USERS IN A MULTIPLE CELL WIRELESS NETWORK

[75] Inventors: Kadathur S. Natarajan, Millwood; Siddhartha R. Chaudhuri, Peekskill; Peter D. Hortensius, Goldens Bridge, all of N.Y.

[73] Assignee: International Business Machines Corporation, Armonk, N.Y.

[21] Appl. No.: 47,038

[22] Filed: Apr. 12, 1993

Related U.S. Application Data

[63] Continuation of Ser. No. 605,285, Oct. 29, 1990, abandoned.

[51] Int. Cl.$^5$ .............................................. H04Q 7/00
[52] U.S. Cl. ................................. 455/33.4; 455/56.1; 455/66; 370/85.3; 370/94.1
[58] Field of Search ......................... 455/14-16, 455/33.1, 33.2, 33.4, 34.1, 53.1, 54.1, 56.1, 66; 370/29, 85.5, 85.8, 93, 94.1, 95.1, 95.3, 110.1, 85.3; 379/56, 58-60

[56] References Cited

U.S. PATENT DOCUMENTS

| | | | |
|---|---|---|---|
| 4,402,090 | 8/1983 | Gfeller et al. | 359/172 |
| 4,456,793 | 6/1984 | Baker et al. | 379/60 |
| 4,535,441 | 8/1985 | Schwaertzel et al. | 455/54.1 |
| 4,597,105 | 6/1986 | Freeburg | 455/33.4 |
| 4,639,914 | 1/1987 | Winters | 370/110.1 |
| 4,665,519 | 5/1987 | Kirchner et al. | 370/94.1 |
| 4,730,310 | 3/1988 | Acampora et al. | 370/95.1 |
| 4,759,051 | 7/1988 | Han | 455/33.2 |
| 4,777,633 | 10/1988 | Fletcher et al. | 370/50 |
| 4,792,946 | 12/1988 | Mayo | 370/14 |
| 4,807,222 | 2/1989 | Amitay | 359/136 |
| 4,837,858 | 6/1989 | Ablay et al. | 455/34.1 |
| 4,852,122 | 7/1989 | Nelson et al. | 375/8 |
| 4,881,271 | 11/1989 | Yamauchi et al. | 455/56.1 |
| 4,926,495 | 5/1990 | Comroe et al. | 455/54.2 |
| 5,029,183 | 7/1991 | Tymes | 375/1 |

OTHER PUBLICATIONS

IBM Technical Disclosure Bulletin, vol. 24, No. 7, Jan. 1982 entitled "Infrared Microbroadcasting Network for In-House Data Communication" by F. Gfeller.

IBM Technical Disclosure Bulletin, vol. 20, No. 7, Dec. 1977, entitled "Wireless Connection Between a Controller and a Plurality of Terminals" by F. Closs et al.

"Teleterminal System", W. Wakao et al. 38th IEEE Vehicular Technology Conference, Jun. 1988, New York, pp. 92-99.

"An Analysis of Asynchronous Request-Centralized Permission Multiple-Access Protocol" by A. T. Kozlowski, IEEE Globecom, vol. 1, Dec. 1986.

"Packet Switching in Digital Cellular Systems", K. Felix, 38th IEEE Vehicular Technology Conference Jun. 1988, New York, pp. 414-418.

*Primary Examiner*—James L. Dwyer
*Assistant Examiner*—Andrew Faile
*Attorney, Agent, or Firm*—Perman & Green

[57] ABSTRACT

A method for communicating information bidirectionally between a wired network (1) and a wireless network. The wireless network is of the type that includes header stations (12) each having a communication cell (2) associated therewith and one or more mobile communication units (10) disposed within the communication cell. The method includes a first step of, during a first portion of a wireless communication cycle, transmitting information over an uplink wireless communication channel from one or more of the mobile communication units to the header station. A second step of the method, accomplished during a second portion of the wireless communication cycle, transmits information over a downlink wireless communication channel from the header station to one or more of the mobile communication units. The information transmitted downlink includes frames of data received by the header station from the wired network. The first portion may be accomplished in part or in total by a CSMA protocol where the mobile units contend for access to the uplink communication channel. In one embodiment the header station initiates the first portion by transmitting to the header stations information for scheduling the sequence of the uplink transmissions.

27 Claims, 7 Drawing Sheets

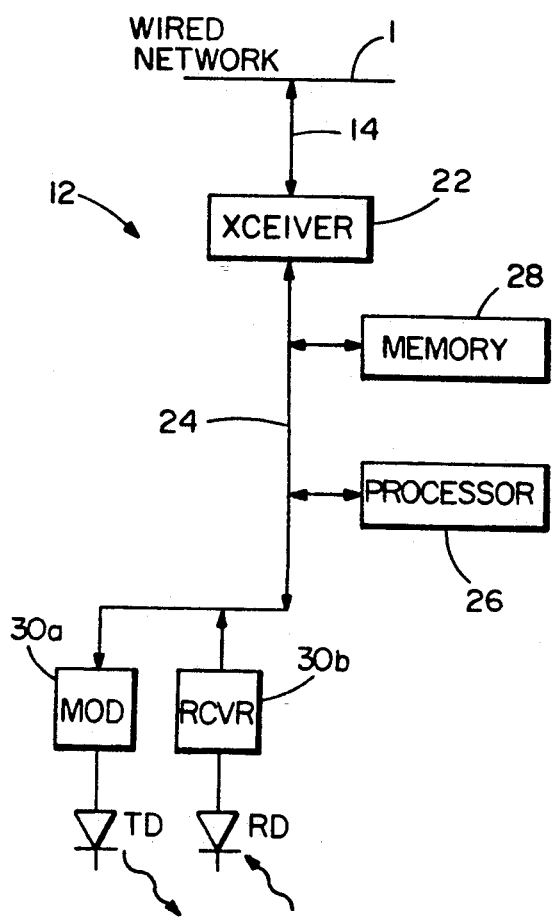
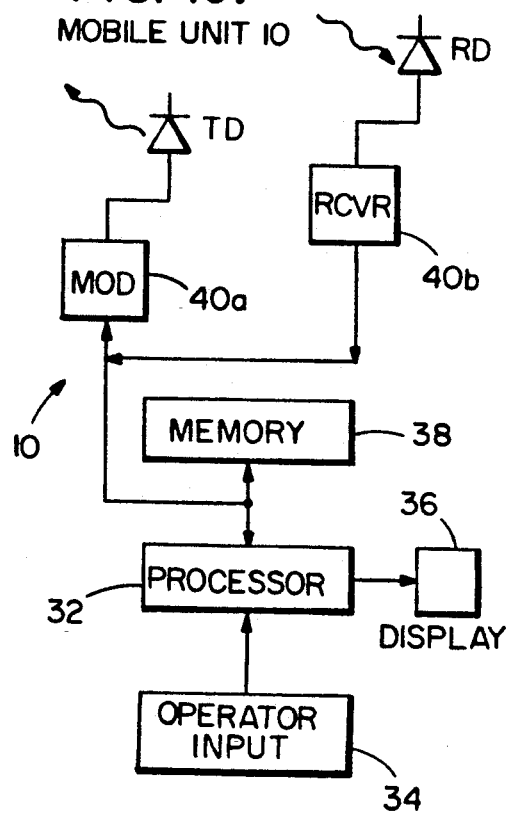

INBOUND DATA TRANSMISSION FLOW CHART IN ENHANCED CSMA

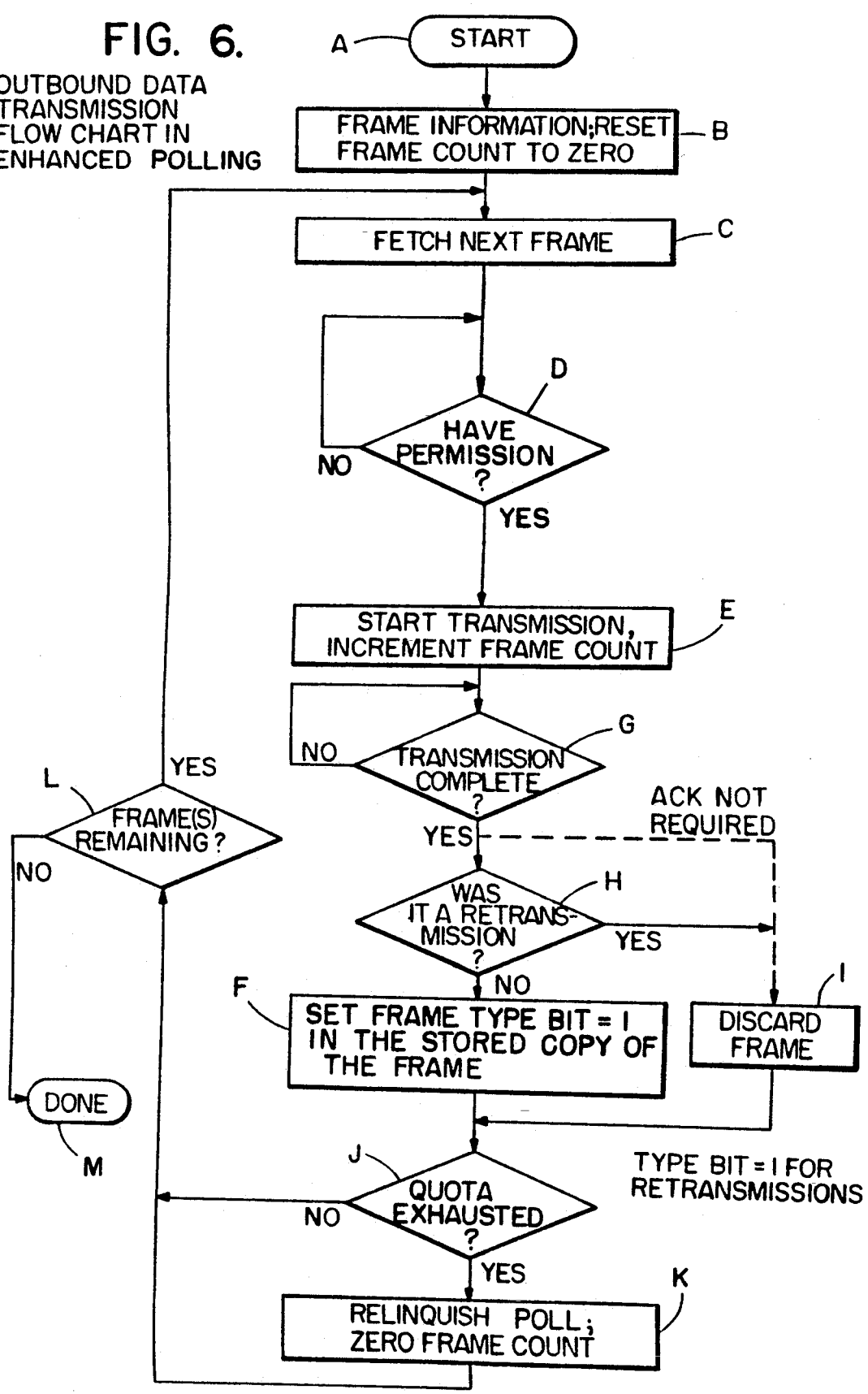

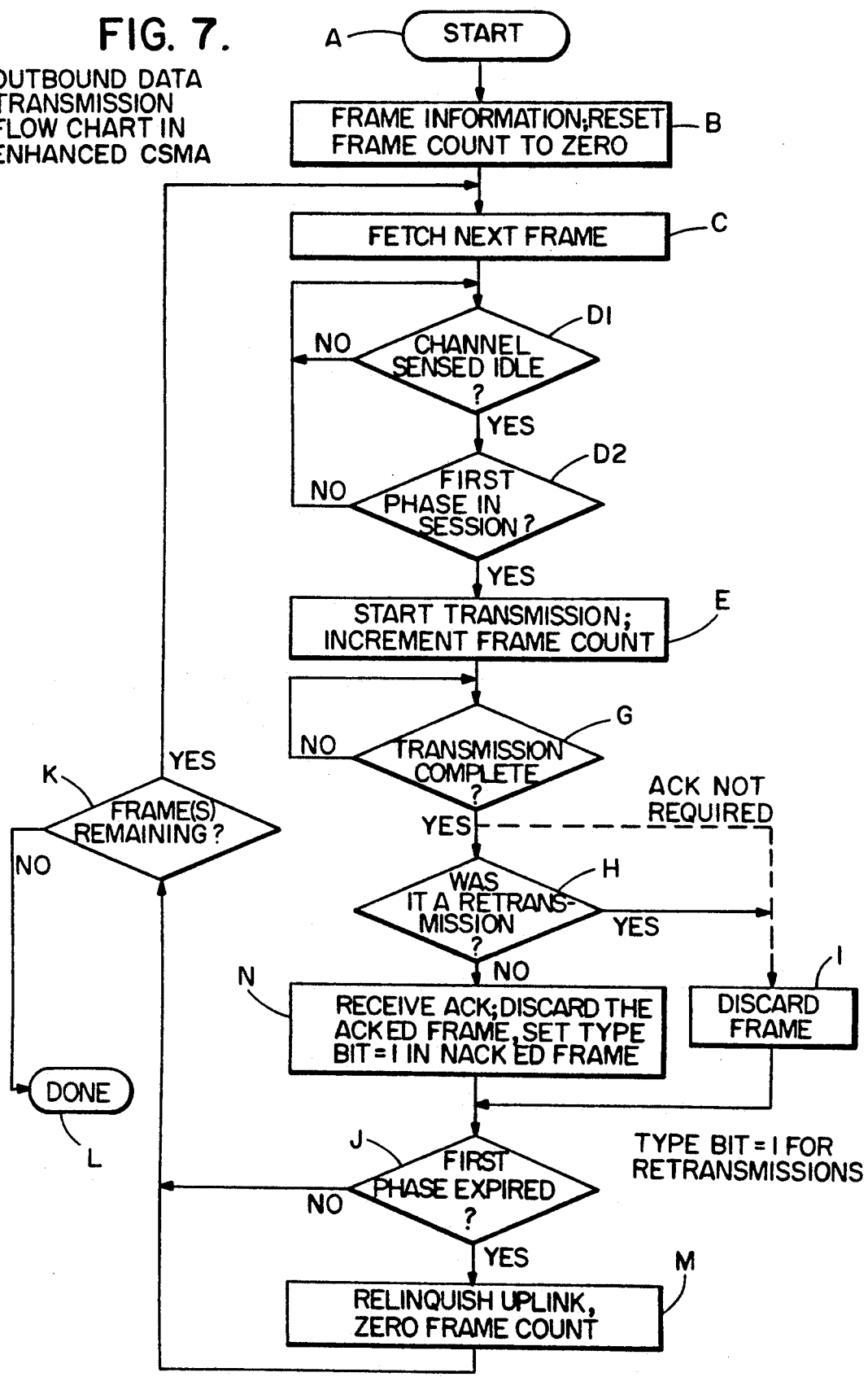

METHODS FOR POLLING MOBILE USERS IN A MULTIPLE CELL WIRELESS NETWORK

This is a continuation of copending application Ser. No. 07/605,285, filed on Oct. 29, 1990, abandoned.

FIELD OF THE INVENTION

This invention relates generally to communication methods and, in particular, to methods for communicating with a plurality of mobile communications units within a multi-cell wireless network.

BACKGROUND OF THE INVENTION

In a local area network (LAN) a user, such as a portable computer equipped with communication capability, gains access to the LAN via a physical connection in order to communicate with remote facilities or use shared resources, such as file servers, print servers, etc. In a stationary mode of operation, all users are static and each user gains access to the network via a fixed homing point. However, in a mobile environment users are free to change their physical location and cannot be restricted to gain access to the network only through one of several homing points attached to the LAN. In a mobile environment the homing points are fixed header stations that communicate with the mobile users through wireless uplink and downlink channels. Examples of wireless links include radio frequency (RF) links, microwave links and infrared (IR) links.

An important consideration in the implementation of a media access protocol in a wireless communications network is that the set of users within a given communications cell typically changes with time. As a result, the fixed header station, with which the cell is associated, cannot assume that the number of users desiring access to the uplink channel is fixed. Neither can the header station assume that the identity of the users accessing the uplink channel is fixed over any extended period of time because the users are free to enter and leave the communications cell.

An additional consideration relates to the types of applications that are to be supported by the wireless network. Diverse communications traffic needs may require different bandwidth and performance requirements to coexist within a given network. By example, data traffic may require low average delay while voice traffic typically requires guaranteed bandwidth and real-time delivery. A multi-access protocol must be capable of satisfying such diverse requirements.

The following U.S. Patents and articles are made of record for teaching various aspects of mobile communication.

The following two U.S. Patents show communication systems having overlapping coverage areas. U.S. Pat. No. 4,597,105, Jun. 24, 1986, entitled "Data Communications System having Overlapping Receiver coverage Zones" to Freeburg and U.S. Pat. No. 4,881,271, issued Nov. 14, 1989, entitled "Portable Wireless Communication Systems" to Yamauchi et al. Yamauchi et al. provide for a hand-off of a subscriber station from one base station to another by the base station continually monitoring the signal strength of the subscriber station.

The following U.S. patents teach various aspects of wireless communication networks.

In U.S. Pat. No. 4,792,946, issued Dec. 20, 1988, entitled "Wireless Local Area Network for Use in Neighborhoods" S. Mayo describes a local area network that includes transceiver stations serially coupled together in a loop.

In U.S. Pat. No. 4,777,633, issued Oct. 11, 1988, entitled "Base Station for Wireless Digital Telephone System" Fletcher et al. describe a base station that communicates with subscriber stations by employing a slotted communications protocol.

In U.S. Pat. No. 4,730,310, issued Mar. 8, 1988, entitled "Terrestrial Communications System" Acampora et al. describe a communications system that employs spot beams, TDMA and frequency reuse to provide communication between a base station and remote stations.

In U.S. Pat. No. 4,655,519, issued May 12, 1987, entitled "Wireless Computer Modem" Kirchner et al. disclose a wireless modem for transferring data in a computer local area network.

In U.S. Pat. No. 4,639,914, issued Jan. 27, 1987, entitled "Wireless PBX/LAN System with Optimum Combining" Winters discloses a wireless LAN system that employs adaptive signal processing to dynamically reassign a user from one channel to another.

In U.S. Pat. No. 4,837,858, issued Jun. 6, 1989, entitled "Subscriber Unit for a Trunked Voice/Data Communication System" Ablay et al. disclose a trunked voice/data subscriber that operates in either a voice mode or one of three data modes.

In U.S. Pat. No. 4,852,122, issued Jul. 25, 1989, entitled "Modem Suited for Wireless Communication Channel Use" Nelson et al. disclose a wireless communication system and, specifically, a modem that communicates digital data with data terminal equipment.

In U.S. Pat. No. 4,926,495, issued May 15, 1990 entitled "Computer Aided Dispatch System" Comroe et al disclose a computer aided dispatch system that includes a master file node and a plurality of user nodes. The master file node maintains a record for each subscriber and automatically transmits an updated record to each dispatcher attached to a subgroup in which the subscriber operates.

In U.S. Pat. No. 4,456,793, issued Jun. 26, 1984, W. E. Baker et al. describe a cordless telephone system having infrared wireless links between handsets and transponders. The transponders are wired to subsystem controllers which are in turn wired to a system controller. The central controller polls the cordless stations every 100 milliseconds to detect cordless station locations and to identify "missing" cordless stations.

In U.S. Pat. No. 4,807,222, issued Feb. 21, 1989 N. Amitay describes a LAN wherein users communicate with RF or IR signals with an assigned Regional Bus Interface Unit (RBIU). Protocols such as CSMA/CD and slotted ALOHA are employed in communicating with the RBIUs.

In commonly assigned U.S. Pat. No. 4,402,090, issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In IBM Technical Disclosure Bulletin, Vol. 20, No. 7, Dec. 1977 F. Closs et al. describe the use of both line-of-sight and diffuse transmission of infrared signals for wireless communications between a ceiling-based controller and a plurality of terminals.

In IBM Technical Disclosure Bulletin, Vol. 24, No. 8, page 4043, January 1982 F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

What is not taught by this prior art, and what is thus an object of the invention to provide, are communication methodologies that realize an efficient allocation of uplink bandwidth to a variable population of mobile communication units in a wireless communications network served by a wired network.

SUMMARY OF THE INVENTION

The foregoing and other problems are overcome and the objects of the invention are realized by a method for communicating information bidirectionally between a wired network and a wireless network. The wireless network is of the type that includes a header station having a communication cell associated therewith and one or more mobile communication units disposed within the communication cell. The method includes a first step of, during a first portion of a wireless communication cycle, transmitting information over an uplink wireless communication channel from one or more of the mobile communication units to the header station. A second step of the method, accomplished during a second portion of the wireless communication cycle, transmits information over a downlink wireless communication channel from the header station to one or more of the mobile communication units. The information transmitted downlink includes frames of data received by the header station from the wired network.

In one embodiment the wireless communication cycle is partitioned into three phases. During a first phase the header station transmits an uplink transmission schedule to specific ones of the mobile units that are known to the header station. After receipt of the schedule the known units transmit uplink information in accordance with the schedule. During the second phase mobile communication units that are unknown to the header station, such as units just entering the communication cell, contend for the uplink channel using a random access protocol technique in order to become attached to the group of known units. Examples of random access protocol techniques include, but are not limited to, ALOHA, CSMA, and address based tree resolution algorithms. During a third phase the header station transmits downlink control messages and stored frames of information received from the wired network. For a system having overlapping communication cells the first phase is initiated by the header station receiving a token from the wired network, the token being a high priority control message that allows the header station to perform wireless communication. At the termination of the third phase the header station passes the software token back to the wired network to enable another header station to accomplish wireless communications.

In accordance with a second embodiment the wireless communications cycle is partitioned into two phases. During a first phase both known and unknown mobile communication units contend for the uplink channel in accordance with a CSMA protocol. After the first phase and during a second phase the header station transmits downlink control messages and stored frames of information received from the wired network.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram illustrating one of the header stations of FIG. 1a;

FIG. 1c is a block diagram illustrating one of the mobile communication units of FIG. 1a;

FIG. 6 is a flowchart illustrating, for the enhanced polling method of the invention, operation of a mobile unit; and FIG. 7 is a flowchart illustrating, for the enhanced CSMA method of the invention, operation of a mobile unit.

DETAILED DESCRIPTION OF THE INVENTION

Figure 1A:
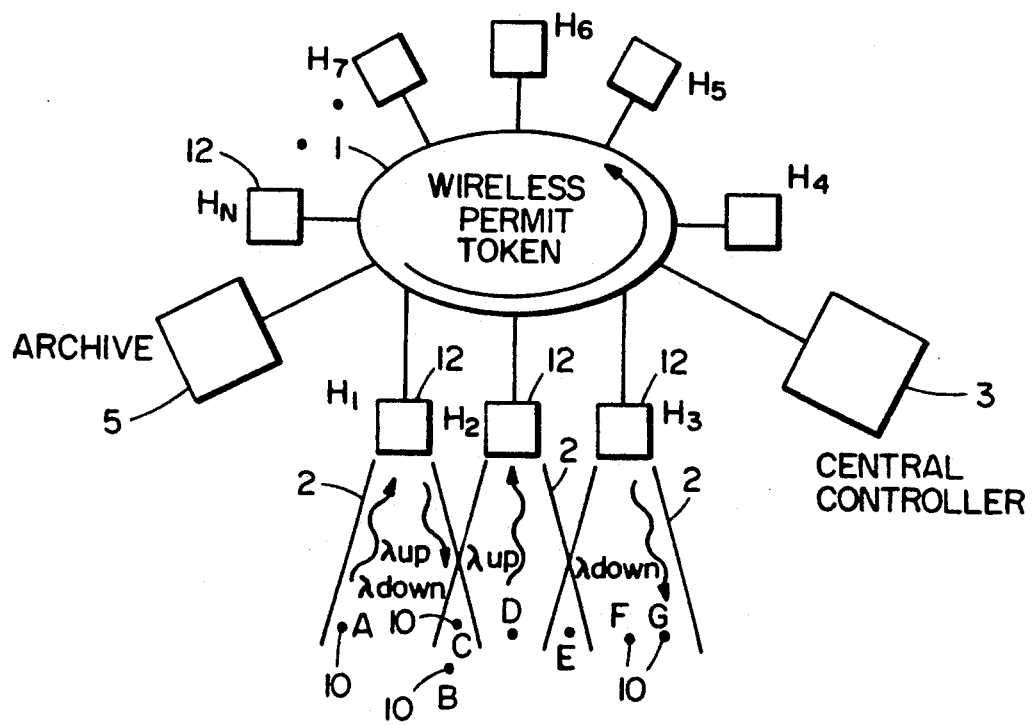
FIG. 1a is a schematic representation of a token ring LAN having a plurality of header stations and a wireless network having overlapping communication cells within which mobile communication units freely migrate.

Referring to FIG. 1a there is shown a typical mobile office communication environment. Users having portable data processing devices, referred to herein as mobile communication units or mobile units 10, are not restricted to gain access to a token-ring communication network 1 via predetermined homing points. Instead, there are provided a finite number of devices, referred to herein as header stations 12, that are attached to the token-ring network 1 at specific points. Each header station 12 has both processing and storage capability to perform store-and-forward communication functions. Each header station 12 functions as a bridge between the wired token-ring LAN and a collection of mobile units 10. The mobile units 10 are in bidirectional communication with the header stations 12 using wireless communication links. Within an area of wireless coverage of a header station, or communication cell 2, the mobile units 10 transmit on a shared uplink at a first frequency ($f_{up}$) and receive messages on a broadcast downlink channel from the header station 12 at a second frequency ($f_{down}$) The same frequencies, or wavelengths for an infrared wireless link, ($f_{up}$) and ($f_{down}$) are reused within each cell in the multicell wireless network.

One suitable token ring network for practicing the teaching of the invention is disclosed in "IBM Token-Ring Network: Architecture Reference", SC30-3374-02, Third Edition, September 1989 (IBM is a registered trademark of the International Business Machines Corporation). It should be realized however that the teaching of the invention is not restricted to only this particular network configuration or to token ring networks in general but may, instead, be practiced with a number of different wired network types.

Each mobile unit (N) is associated with a unique header station (12), denoted as Owner (N), through which the mobile unit 10 accesses the wired token-ring network. A given header station (H) may own multiple mobile units 10 at the same time. The set of mobile units 10 owned by header station (H) is denoted Domain(H).

A suitable method for managing the ownership of the mobile units 10 is disclosed in commonly assigned U.S. patent application Ser. No. 07/605,723, filed on Oct. 29, 1990, and entitled "Distributed Control Methods for Management of Migrating Data Stations in a Wireless Communications Network" by Kadathur S. Natarajan.

The Owner-Domain relationships are logical and indicate for each header station (H) the set of mobile units 10 whose communication needs are managed by H. However, when a mobile unit 10 is in an overlapping area, its uplink transmissions can be heard by more than one header station 12, including its present owner and all potential owners in whose cells it is located. For example, in FIG. 1, uplink transmissions from B may interfere with transmissions by A, C, D and E.

However B does not interfere with F because B and F can never transmit to the same header station 12. For the same reason, B and G do not interfere with one another. The interference is not limited to uplink transmissions alone. A mobile unit 10, such as B, that is within an overlapping cell area can receive broadcast signals from multiple header stations 12 (B can receive from both $H_1$ and $H_2$). If a mobile unit 10 simultaneously receives broadcast messages from more than one header station 12 a collision occurs and the messages are received erroneously.

Suitable methods for scheduling activation of the various communications cells to avoid interference and to optimize frequency reuse is disclosed in commonly assigned U.S. patent application Ser. No. 07/605,291, filed on Oct. 29, 1990, and entitled "Scheduling Methods for Efficient Frequency Reuse in a Multi-cell Wireless Network Served by a Wired Local Area Network" by Kadathur S. Natarajan.

Before discussing the methods of the invention in further detail reference is made to FIGS. 1b and 1c wherein embodiments of the header stations 12 and mobile units 10, respectively, are shown in block diagram form. In a presently preferred embodiment of the invention the wireless communications channels are carried via an infrared (IR) data link. Presently available optical devices readily provide for operation within the range of approximately 750 nanometers to approximately 1000 nanometers. Within each cell 2 of the IR wireless system of the invention the uplink communications are carried by a first wavelength while the downlink communications are conveyed by a second wavelength that differs from the first wavelength.

Referring to FIG. 1b there is shown a simplified block diagram of the header station 12. The header station 12 is coupled to the LAN 1 via a connector 14. Connector 14 is coupled to a network adapter transceiver 22 which in turn is coupled to an internal bus 24. The header station 12 includes a processor 26 that is bidirectionally coupled to a memory 28 that stores program-related and other data, including packets of data transmitted to or received from the mobile units 10. Processor 26 also communicates with IR modulators and receivers; specifically a modulator 30a and a receiver 30b. The IR modulator and receiver have inputs coupled to suitable infrared emitting or receiving devices such as laser diodes, LEDs and photodetectors. In the illustrated embodiment the modulator 30a has an output coupled to a transmit diode (TD) and the receiver 30b has an input coupled to a receive photodiode (RD).

Referring now to FIG. 1c there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the header station 12 and also an identification of the mobile unit 10. Also coupled to processor 32 are a modulator 40a and a receiver 40b. The data receivers of FIGS. 1b and 1c include demodulators and filters and operate in a conventional manner to extract the modulated bit stream from the received optical signals. Similarly, the modulators of FIGS. 1b and 1c operate in a conventional manner to modulate the optical output in accordance with a transmitted bit stream. A preferred data transmission rate is in the range of approximately one to ten million bits per second (1-10 Mbits/sec), although any suitable data transmission rate may be employed.

In the wireless communication system of the invention all wireless communication is between the header station 12 and the mobile units 10. There is no direct communication between the mobile units 10.

Although described in the context of a wireless network employing an IR medium it should be realized that the method of the invention may also be practiced with other types of wireless networks that employ, by example, radio frequency (RF) and microwave mediums. For a selected wireless medium one consideration is the propagation delay of the wireless signals. The propagation delay is primarily a function of the size of the communication cell 2. For an IR wireless link cell sizes are relatively small (tens of feet) and the propagation delay is negligible. For RF embodiments cell sizes are much larger (in the range of hundreds to thousands of feet) with correspondingly larger propagation delays.

In accordance with an aspect of the invention there are first described two enhanced polling-based protocol methods. The protocol provides a means for managing a mobile population of users, such as the mobile units 10.

Figure 2:
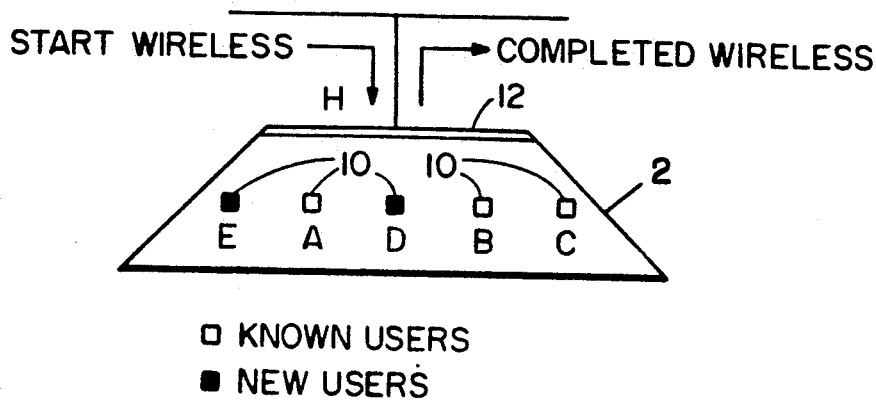
FIG. 2 shows a communication cell containing a plurality of users, including known users and new users.
Figure 3:
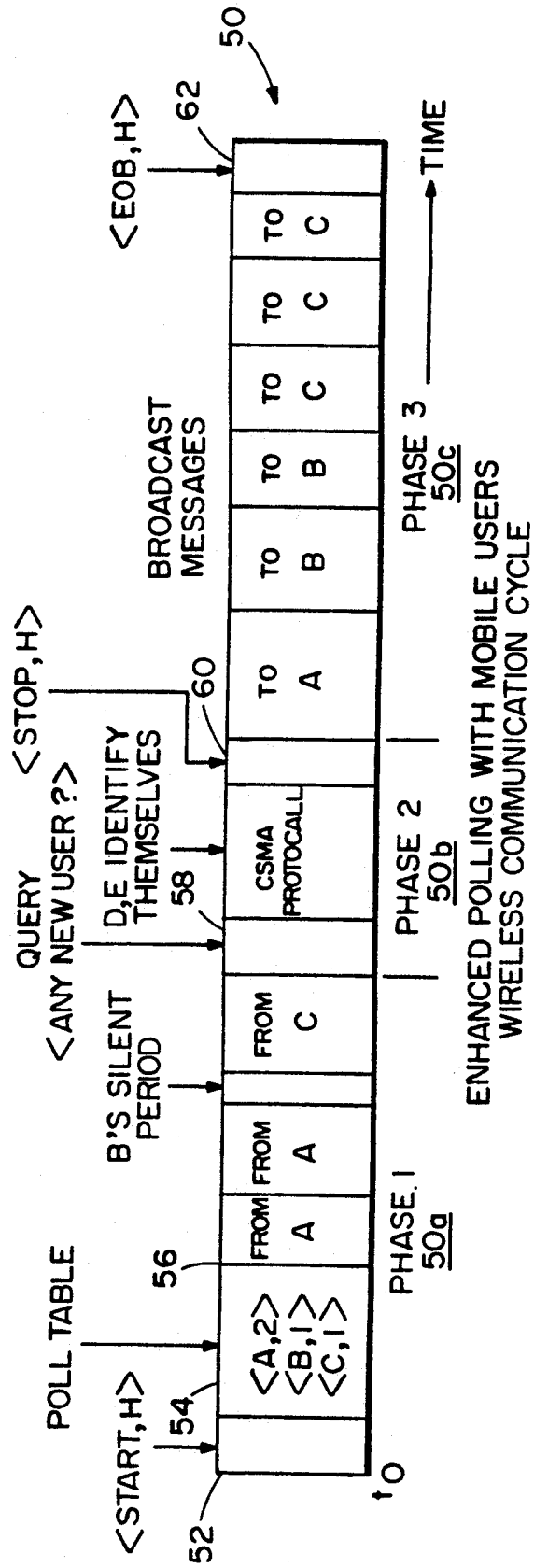
FIG. 3 illustrates a communications protocol employed by the header station, the protocol including a user polling phase, a phase wherein new users attach themselves to the header station, and a broadcast message phase.

Referring to FIGS. 2 and 3 a first polling method of the invention is described.

Consider first a header station 12 having a set of N mobile units 10 {A, B, . . . ,(n)} in its domain. An implicit assumption is that the header station 12 is aware of the identity of the mobile units 10 under its control. One suitable method for maintaining this list in a mobile environment is described in the aforementioned commonly assigned U.S. patent application Ser. No. 07/605,723, filed on Oct. 29, 1990, and entitled "Distributed Control Methods for Management of Migrating Data Stations in a Wireless Communications Network" by Kadathur S. Natarajan.

For the purpose of description of the polling-based method a polling cycle 50 is partitioned into three phases 50a, 50b, and 50c.

A description of Phase I (50a) is now provided. The header station 12 initiates wireless operation within its domain at time $t_0$. The header station 12 first transmits on the downlink a Start of Transmission message 52, having a predetermined bit sequence, to synchronize all of the mobile units 10 with the start of the polling cycle 50. The header station 12 next broadcasts on the downlink a Polling Table 54 that is expressive of a sequence in which the mobile units 10 are to transmit their data, if any, to the header station 12. The Polling Table 54 contains a permutation of the (n) identifiers of (n) mobile units and forms an ordered list of tuples of the form $<MU_i, MSG_i>$, where i = 1 to n. $MU_i$ identifies a specific one of the Mobile Units and $MSG_i$ specifies, by example, a number of messages, a number of bytes or, if employed in a slotted system, specifies a number of uplink slots that may be used during the current polling cycle 50 by the specified mobile unit 10.

In FIG. 3 the mobile units that are known to the header station 12 at the beginning of the polling cycle 50 are A, B and C. As an example, and assuming that assignments are made in message units, the mobile unit A is allocated two uplink data transmission messages while mobile units B and C are each allocated one message. However, as was previously stated the assignments may be in other units, such as a number of bytes or even units of time.

Next, a Polling Table delimiter 56 is broadcast to mark the end of the Polling Table 54. The mobile units 10 next proceed with uplink transmissions according to the order specified by the Polling Table 54. When a given one of the mobile units determines its turn to transmit, it sends up to a maximum of the allocated ($MSG_i$) messages, which may be data and/or control messages, to the header station 12.

To facilitate this operation the header station 12 immediately repeats all uplink transmissions on the downlink. As such, all mobile units 10 within the cell receive all other mobile units' uplink transmissions. Since each mobile unit transmits its unique identifier as a part of the uplink transmission each mobile unit 10 thus determines its respective transmission order relative to the Polling Table 54. When a given one of the mobile units 10 completes the uplink transmission, other mobile units 10 delay transmission for (L) seconds, where (L) is at least as large as the maximum propagation delay between any two mobile units 10 within the cell plus any mandatory spacing between two consecutive transmissions. After the delay period the next assigned mobile unit transmits on the uplink only if it has data or control messages to transmit. If it does not have any message to transmit, the mobile unit 10 remains silent. In FIG. 3 it can be seen that mobile unit B remains silent during its assigned uplink slot. Thus, after the expiration of the uplink transmission delay of (L) seconds, if another assigned mobile unit does not detect a transmission from the the preceding mobile unit in the Polling Table 54 queue, the next assigned mobile unit, assuming that it does not have at least one message to transmit, begins transmission on the uplink.

In FIG. 3, it can be seen that mobile unit A transmits two messages, mobile unit B remains silent, and mobile unit C begins transmission immediately after the expiration of mobile unit B's delay period. As such, the uplink bandwidth is not wasted even though certain mobile units with no messages to transmit are assigned uplink slots.

After the last mobile unit 10 assigned in the Polling Table 54 finishes transmission all of the uplink transmission are deemed complete for the Polling Cycle 50 and Phase 1 (50a) is terminated.

In the second phase of the Polling Cycle 50 the header station 12 provides an opportunity for new mobile units 10, if any, to send messages to the header station 12. For example, a new mobile unit 10 may be one that has just entered the communication cell 2 and that intends to join the domain of the header station 12. This new mobile unit 10 is thus enabled to send a control message addressed to the header station 12. At the start of the second phase, the header station 12 broadcasts a control message 58 containing an identifier of the header station 12 and a query for new users. Upon receiving the control message 58 all new mobile units 10, i.e., those who are not currently attached to the header station 12 but which intend to join its domain, contend among themselves for access to the uplink and identify themselves in a random access mode, using a carrier-sense multiple access (CSMA) protocol. Each new mobile unit 10 transmits immediately upon receiving the query control message 58.

If the request is received correctly by the header station 12 then a positive acknowledgement (ACK) is returned. If more than one mobile unit 10 attempts to identify itself, a collision occurs. If the header station 12 does not receive any of the identification requests correctly, then no positive acknowledgement message is returned and the requesting mobile units 10 infer that their requests were not received correctly by the header station 12. Each requesting mobile unit 10 follows one of the many rescheduling and retransmission protocols that are well known in the art. A typical rescheduling and retransmission protocol requires the mobile unit 10 to delay for some random interval of time, and then once more attempt uplink transmission.

If it is assumed that the mobile units' rate of movement, and thus the number of crossings into new cells per second, is small compared to the number of polling cycles per second, then the contention phase (Phase 2) of the polling cycle 50 is an insignificant fraction of the total polling cycle 50 duration.

To terminate Phase 2 (50b) the header station 12 broadcasts a control message <STOP> 60 to stop uplink message transmissions from the new mobile units. If a new mobile unit 10 is not successful in sending its uplink control message during a given polling cycle 50, it attempts again during the contention phase of a next polling cycle 50.

During Phase 3 (50c) of the polling cycle 50 the header station 12 broadcasts inbound transmissions into the cell 2. As employed herein inbound transmissions are considered to be those from the wired network 1 into the wireless network to one of the mobile units 10 within the domain of the header station 12. Outbound transmissions are considered to be those from a mobile unit 10 to the wired network 1. The inbound transmissions include data packets that have arrived over the wired network 1 and that may have been buffered before delivery to mobile units 10 within the cell 2. Data and/or control messages addressed to specific (or all) mobile units 10 are transmitted on the downlink in a broadcast mode. On receipt of a data message corresponding to its unique address a mobile unit 10 checks for correctness and, if appropriate, generates a positive acknowledgement message.

The header station 12 can terminate the downlink transmission using one of three application dependent criteria: (a) exhaustive service, (b) limited service, or (c) gated service. In exhaustive service the header station 12 remains in the broadcast mode (Phase 3) until all buffered frames of data are transmitted, including any that may have arrived from the wired network 1 during the present Phase 3. In limited service the header station 12 remains in Phase 3 for either a predetermined maximum amount of time or until some predetermined number of frames have been broadcast. If frames remain to be broadcast they remain buffered until the next communication cycle. Gated service is similar to exhaustive service except that only those frames that are buffered at the beginning of Phase 3 are broadcast. That is, any that arrive during Phase 3 are buffered for a next communication cycle.

Whichever of these three criteria are employed, the header station 12 broadcasts a control message <EOB> 62 to signify the end of the broadcast phase of the current polling cycle 50.

For the case of overlapping transmission cells, as in FIG. 1a, and to avoid interference with a neighboring cell, at the completion of the polling cycle 50 the header station 12 relinquishes the right to perform wireless communication. As described in the above mentioned commonly assigned U.S. patent application Ser. No. 07/605,291, filed on Oct. 29, 1990, and entitled "Scheduling Methods for Efficient Frequency Reuse in a Multi-cell Wireless Network Served by a Wired Local Area Network" by Kadathur S. Natarajan, a wireless communication permit token is passed to a next header station along the network 1. The next header station takes up the permit token and initiates the polling cycle 50 with the mobile units within its associated communication cell. Subsequently the first header station 12 regains the permit token and initiates the next polling cycle 50.

During the time between the end of a current polling cycle and the beginning of the next cycle a header station 12 performs such tasks as checking data messages for correct reception, preparing acknowledgments, generating and receiving network 1 messages related to management of mobile unit 10 movements, and performs other control functions.

The second polling method referred to above differs from the first, just described, method in how the inbound transmissions are handled during Phase (50a). In accordance with this method the header station 12 interrogates each mobile unit 10 explicitly in sequence to determine if the mobile unit 10 has any messages to transmit. A mobile unit 10 that is so addressed takes one of the following actions.

If it has a message to send, it transmits the message on the uplink.

If it has no message to send, the mobile unit 10 indicates this condition by either of the following two methods. One, the mobile unit 10 sends a predetermined message to the header station 12 indicating that it has no uplink message to transmit. Alternatively the mobile unit 10 does nothing by way of response to the polling message.

Using this latter technique the header station 12 waits for a predetermined time-out period. If the mobile unit 10 that was polled does not respond within the time-out period, the header station 12 assumes the mobile unit 10 has nothing to send in the present polling cycle 50 and queries the next mobile unit 10. An advantage of this latter technique is that the mobile unit 10 is not required to consume battery power in order to indicate that it has no message to transmit. The conservation of battery power is an important consideration for portable data processing units. The duration of the time-out period is selected to minimize overhead due to polling switchover from mobile unit 10 to mobile unit 10.

Phase 1 (50a) is completed when all the mobile units 10 within the control of a header station 12 have been polled in turn. The second and third phases (50b and 50c) of the polling cycle 50 are identical to those described above.

Advantages provided by both of these polling techniques include but are not limited to the following. The mobile units 10 may be polled with variable frequency so that those with greater bandwidth requirement are polled more often than those with lesser bandwidth requirement. Also, the polling techniques are readily made adaptive such that a mobile unit requiring greater instantaneous message traffic or those with priority traffic may be polled more often than others.

In addition, the polling method of the invention facilitates the management of the migrating mobile units 10. For example, the header station 12 may assume that the mobile unit A is still within its domain. However, in reality the mobile unit A may have (a) left the cell and moved into another cell, (b) left the cell and the wireless network altogether, or (c) remained in the cell but entered an inactive state.

If the header station 12 that owns mobile unit A has not received a response from mobile unit A for some predetermined number (CMAX) of consecutive polling cycles, it sends a special Confirmation control message in the next polling cycle. The Confirmation control message is directed to mobile unit A and instructs it to confirm its presence in the cell 2. Upon receipt of the Confirmation control message the mobile unit 10 transmits a response, assuming that it is still within the cell and is in an active mode of operation. If no response is forthcoming from the mobile unit 10 the header station 12 assumes the departure of mobile unit A from its domain of control. The header station 12 deletes the identification of the departed mobile unit 10 from an internally maintained polling table of owned mobile units and transmits any status information, including any buffered data transmissions, associated with the mobile unit A to an archival wired network node (ARCH) 5 that serves as a repository for such information. The header station 12 may maintain a record, for some predetermined interval of time, that the mobile unit A's status is stored in the archival node ARCH 5 in the event that the mobile unit reenters the cell 2 or once more becomes active.

If the multi-cell wireless network contains one or more communication cells that are totally disjoint from all other cells, and hence non-interfering, these disjoint cells may conduct continuous polling operations without any interruption. That is, the permit token described above is not required in order to initiate wireless communication within these disjoint cells.

A discussion is now made of a further embodiment of the invention wherein the uplink channel is shared through an enhanced Carrier Sense Multiple Access (CSMA) protocol, as described in detail below. This protocol has an advantage of simplicity and low-cost implementation.

If the uplink channel is available only a fraction of the time, referred to herein as an intermittently available channel, all of the traffic that tends to accumulate when the channel is not available must be transmitted when the channel becomes available. The CSMA protocol and its variations were originally developed assuming continuous availability of the channel with random arrivals of traffic at the stations attached to the channel. In a wireless network, however, these conditions typically do not exist.

This embodiment of the invention thus concerns a multi-access protocol used for sharing an intermittently available broadcast channel. By example, and referring to FIG. 4, it is assumed that a header station intends to initiate wireless operation within its domain. The header station 12 first accomplishes outbound (uplink) transmissions (Phase 1) that are later followed by inbound (downlink) broadcast transmissions (Phase 2). The header station then ceases wireless transmission and the Intermittent Broadcast channel enters an OFF state. To initiate the uplink transmission, as described in relation to FIG. 4, the header station 12 broadcasts the START message 52. The mobile units 10 that may respond fall in two groups: (a) those that already are owned by the header station 12 and that have messages awaiting outbound transmission, and (b) those that are not currently owned by the header station 12 but intend to become owned by the header station 12.

At the beginning of each wireless cycle let the group of mobile units 10 that respond to the START message 52 be called ACTIVE. Each mobile unit 10 that is ACTIVE generates a random number and schedules its uplink transmission at a time corresponding to the random number. Time 0 corresponds to the time that the START message 52 is received by the mobile unit 10. When the scheduled time for transmitting a message arrives, the mobile unit 10 senses the wireless channel to determine if it is in use. If so, the message is rescheduled for transmission after the random interval at which time message transmission is attempted again. If instead the mobile unit 10 senses an idle wireless channel, it begins immediate transmission. In this regard control messages and data messages are treated alike and each require contention for the uplink channel. New mobile units 10 can thus attach to the header station 12 without requiring the separate connection phase as described in relation to Phase 2 (50b) above. When a header station 12 receives a message from a mobile unit 10 the message is simultaneously rebroadcast on the downlink, to enable carrier sensing to be accomplished by mobile units, and the message is also buffered by the header station 12 for subsequent routing to the appropriate destination on the wired network 1, or the wireless network via the wired network.

After a predetermined amount of time has elapsed, the uplink transmissions are terminated as follows. The header station 12 broadcasts a special control message <STOP,H> (Stop Uplink Transmission to Header Station (H)). All ACTIVE mobile units 10 delay their uplink transmissions until the intermittent broadcast channel is reenabled for uplink transmission by the transmission of another START message 52. After terminating the uplink messages the header station 12 broadcasts inbound messages on the downlink (Phase 2). The mobile units 10 for which the inbound messages are addressed receive the messages, check the messages for correctness and generate, if required, an appropriate acknowledgement message. The header station 12 terminates the broadcast phase, as described before, by one of three criteria: exhaustive service, limited service, or gated service. The Header Station 12 then transmits on the downlink a special control message <EOB,H> (End of Broadcast on the Downlink for Header Station (H)).

Figure 4:
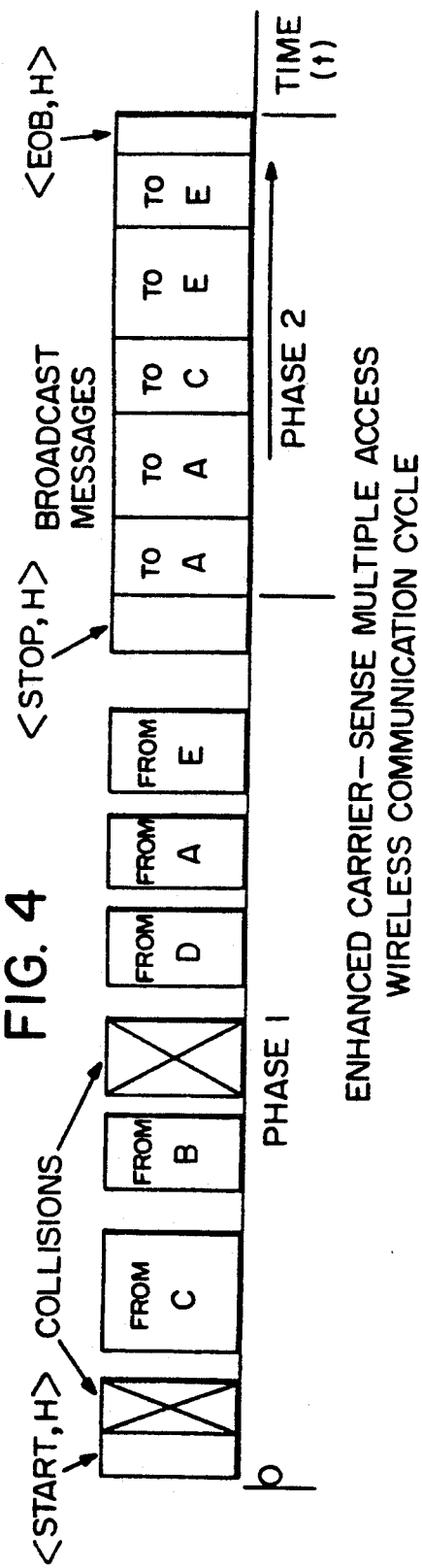
FIG. 4 illustrates a communication protocol wherein an uplink communication phase is conducted in accordance with an enhanced carrier-sense, multiple access protocol.

This enhanced CSMA embodiment of the invention can be seen in FIG. 4 to permit the merging of the operations of Phase 1 and Phase 2 in that unattached mobile units 10 contend for the uplink channel along with those mobile units already attached. The enhanced CSMA embodiment of the invention eliminates the necessity for the downlink transmission of the Polling Table 54 and the Polling Table delimiter 56. The enhanced CSMA method thus results in a two phase communication cycle with the mobile units 10 contending for the uplink during the first phase and downlink messages being provided during the second phase. It should be realized however that the first and second phases may be logically reversed, with the mobile units 10 contending for the uplink during the first phase and downlink messages being provided during the second phase.

The CSMA embodiment of the communication cycle depicted in FIG. 4, in that uplink bandwidth usage is not explicitly controlled by the header station, may best be employed in applications where all of the mobile units 10 typically have the same message response priority levels. For example, this embodiment may be best suited for applications where all mobile units 10 transmit uplink low-speed data, such as keystrokes, as opposed to real-time data such as speech. The three phase embodiment of FIG. 2 may best be suited for applications where the mobile units 10 have different message requirements and priorities, wherein units requiring a greater bandwidth can be allocated more uplink slots on a more frequent basis. Also, those mobile units requiring a guaranteed bandwidth for real time application can be guaranteed to be serviced in every polling cycle by controlled allocation of uplink bandwidth.

Figure 5A:
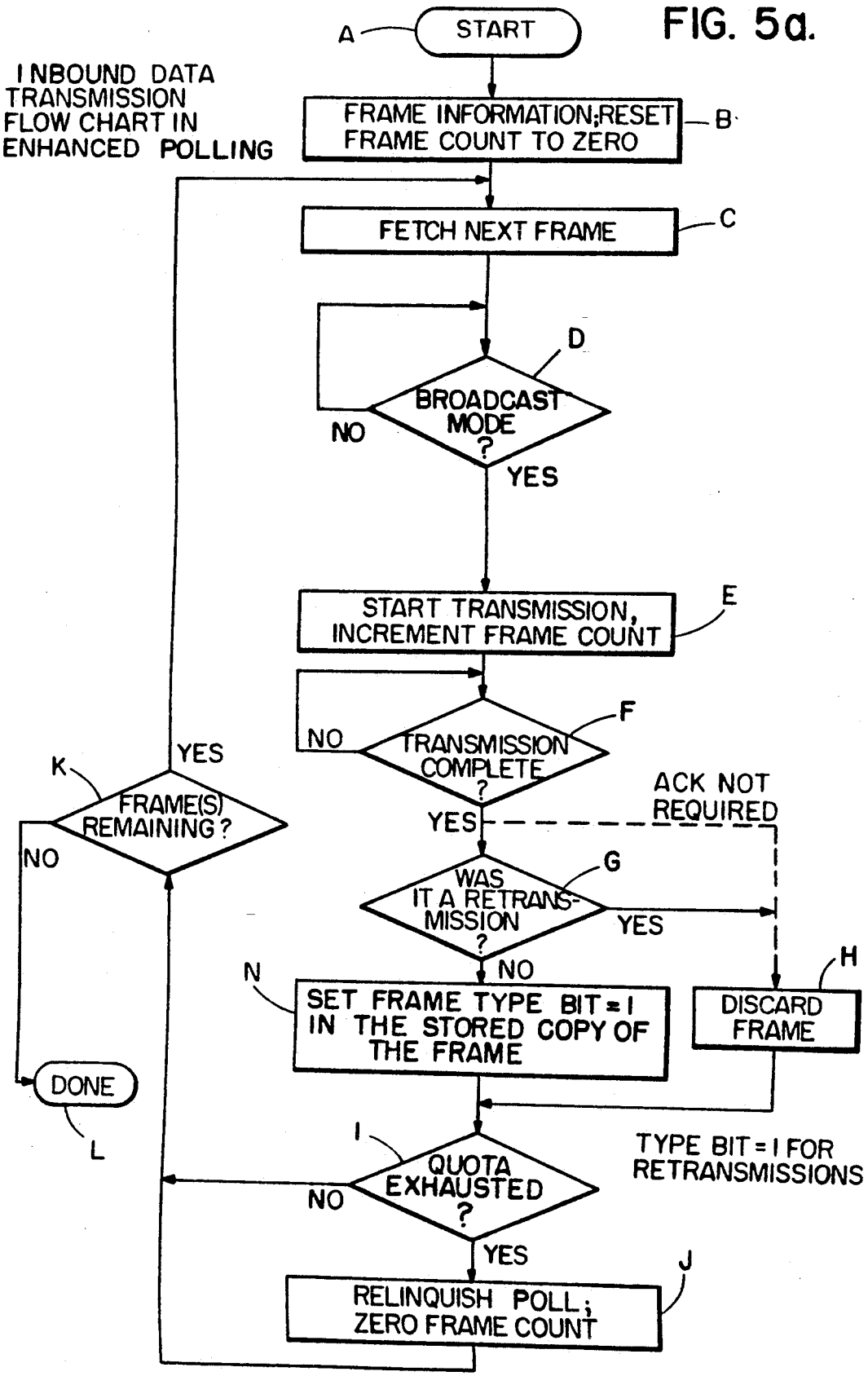
FIGS. 5a and 5b are flowcharts depicting inbound data transmission at a header station for an enhanced polling method and for an enhanced CSMA method, respectively.
Figure 5B:
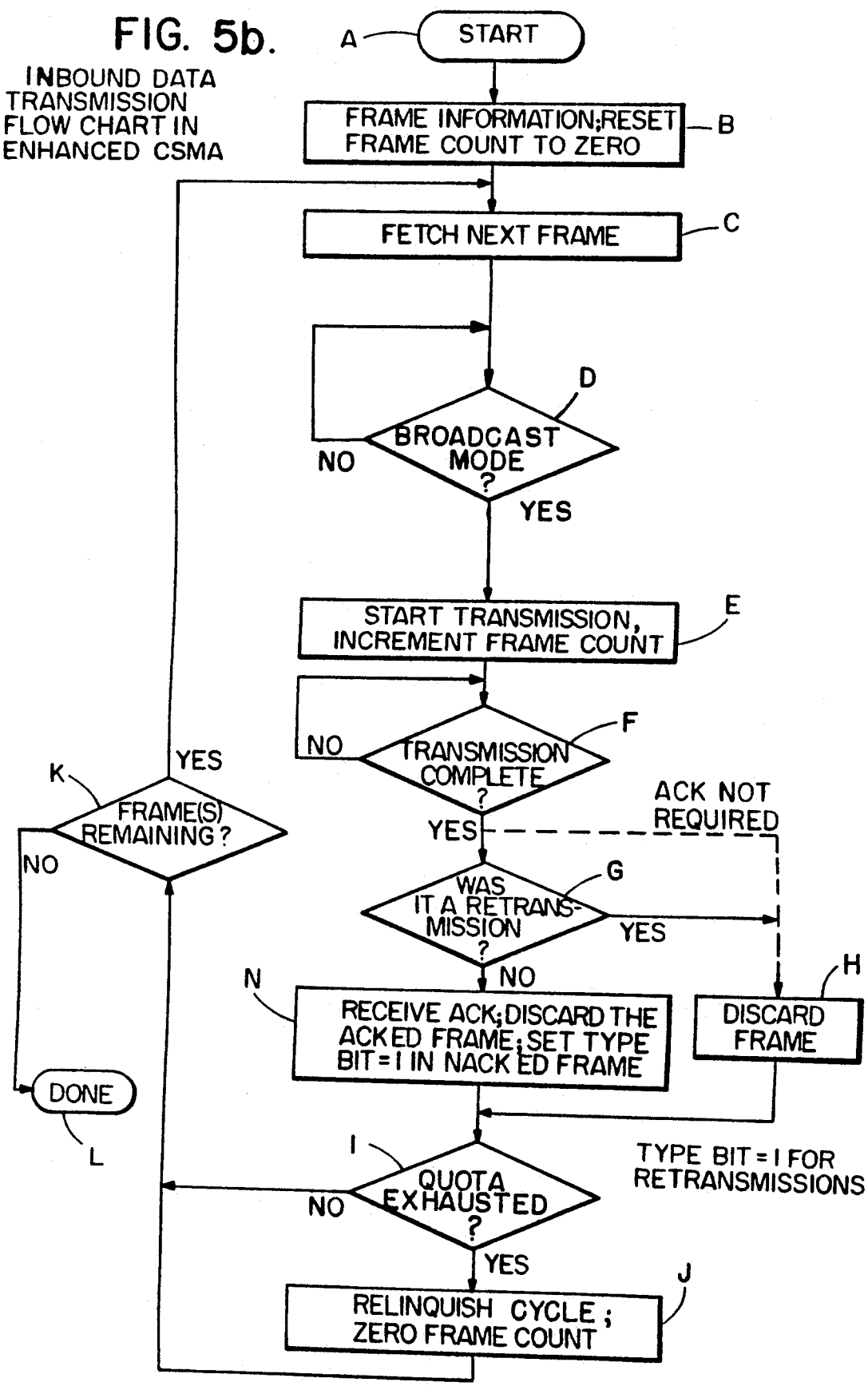

FIGS. 5(a) and 5(b) are flowcharts depicting in detail inbound data transmission at the header station 12. FIGS. 6 and 7 are flowcharts depicting in detail outbound data transmission at the mobile unit 10 (Phase of FIG. 3), and outbound data transmission at the mobile unit 10 for the enhanced CSMA embodiment (Phase 1 of FIG. 4), respectively. Dotted paths indicate paths for systems where ACK signals are not employed. In the flowcharts Frames refer to discrete message or control packets formatted in a manner suitable for transmission and reception over the wireless medium.

Referring to FIGS. 5(a) and 5(b), the header station 12 starts inbound data transmission at Block A and initializes frame count information to zero at Block B. The header station 12 then enters a main data transmission loop and fetches a first (next) frame at Block C. The header station 12 determines in Block D if the broadcast mode (Phase 3 of FIG. 3 or Phase 2 of FIG. 4) is in effect. If not the header station loops waiting for the broadcast mode to begin. When the broadcast mode is in effect the header station 12 starts the transmission of the frame fetched at Block C and increments a frame count (Block E). At Block F the header station 12 loops waiting for the ongoing frame transmission to be completed. At Block G a determination is made if the message transmitted was a retransmission, that is, if a NACK was previously received from a mobile unit 12 indicating that the frame was previously received in error. In FIG. 5(a) (Enhanced polling) at Block N the frame is marked and saved for retransmission. In FIG. 5(b) (Enhanced CSMA) at Block N the frame is marked and saved for retransmission only if no ACK is received immediately. After a frame is retransmitted the frame is discarded at Block H. Frames are also discarded after a successful transmission. If in the limited service mode of operation a determination is made at Block I if the quota of frame transmissions for the header station 12 is exhausted or if the maximum allocated time for the broadcast mode has expired. If the quota is exhausted the header station 12 terminates wireless transmission at Block J by relinquishing the privileged network token to another header station 12 on the wired network 1. The frame count is also zeroed. If the quota is not exhausted at Block I a check is made at Block K to determine if any frames remain to be transmitted. If yes the next frame is fetched at Block C, otherwise the header station 12 terminates inbound data transmission at Block L. For the exhaustive mode of operation the quota checked at Block I can be made arbitrarily large. At Block L, a DONE condition indicates that the permit for wireless operation is relinquished.

In FIG. 6 there is depicted the transmission from one of the mobile units 10 employing the enhanced polling method of the invention. At Block A data transmission is started and at Block B frame count information is initialized at zero. The first (next) frame is fetched at Block C and the mobile unit 10 determines at Block D if it has permission to transmission the uplink. The mobile unit 10 has permission if Phase 1 of the Enhanced Polling method is in progress and if it is the turn of the mobile unit 10 according to the sequence specified in the Polling Table 54 received from the header station 12. If no, the mobile unit 10 loops waiting for permission otherwise it begins frame transmission at Block E. The mobile unit 10 then loops waiting for the transmission to be complete (Block G). If a retransmission was accomplished (Block H) the frame is discarded at Block I. A determination is made at Block J if the assigned quota of uplink frames has been exhausted. If yes, the mobile unit 10 implicitly relinquishes the uplink channel by refraining from further uplink transmissions in Phase 1 of this Polling cycle and zeroes its frame count (Block K). If the quota is not exhausted mobile unit 10 determines if any frames remain to be transmitted (Block L). If "yes" the next frame is fetched at Block C and the transmission is repeated. If no frames remain to be transmitted the mobile unit 10 implicitly relinquishes the uplink channel and terminates transmission (Block M).

FIG. 7 depicts the uplink transmission from a mobile unit 10 using the enhanced CSMA technique of the invention (Phase 1 of FIG. 4). At Block A data transmission is started and at Block B frame count information is initialized at zero. The first (next) frame is fetched at Block C and the mobile unit 10 determine if it has permission to transmit on the uplink. The mobile unit 10 has permission if the channel is sensed idle (at Block D1) and if the first Phase is in progress (at Block D2). If "no" at either Block D1 or Block D2 the mobile unit 10 loops waiting for permission. Otherwise it begins frame transmission at Block E. The mobile unit 10 loops waiting for the transmission to be complete (Block G). If a retransmission was accomplished (Block H) the frame is discarded at Block I. A determination is made at Block J if the first phase has been terminated. This determination is made by the mobile unit 10 by receiving a <STOP> message from the header station 12. If "yes" the mobile unit 10 relinquishes the uplink channel by refraining from further uplink transmission in Phase 1 of this cycle, and zeroes the frame count (Block M). If it is determined that the first phase has not yet expired the mobile unit 10 determines at Block K if any frames remain to be transmitted and, if so, control returns to Block C where the next frame is fetched. If no frames remain to be transmitted the mobile unit 10 terminates contention for the uplink at Block L. If at Block J it is determined that the first phase has expired the mobile unit 10 relinquishes transmission and zeroes the frame count (Block M).

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for communicating information bidirectionally between a wired network and a wireless network, the wireless network including a header station having a communication cell associated therewith and one or more mobile communication units disposed within the communication cell, the method comprising the steps of:

partitioning, with the header station, a wireless communication cycle time period into an uplink portion of the time period and into a downlink portion of the time period; the step of partitioning including the steps of, transmitting a Start signal with the header station, the Start signal indicating a beginning of the uplink portion of the wireless communication cycle time period;

transmitting a first Stop signal with the header station, the first Stop signal indicating a termination of the uplink portion of the wireless communication cycle time period and a beginning of downlink portion; and transmitting a second Stop signal with the header station, the second Stop signal indicating a terminal of the downlink portion of the wireless communication cycle time period;

the method further including the steps of, during the uplink portion of the wireless communication cycle time period, transmitting information over an uplink wireless communication channel from one or more of the mobile communication units to the header station; and during the downlink portion of the wireless communication cycle time period, transmitting information over a downlink wireless communication channel from the header station to one or more of the mobile communication units, the information transmitted over the downlink wireless communication channel including data received by the header station from the wired network.

2. A method as set forth in claim 1 wherein the step of transmitting uplink information includes an initial step of:

transmitting scheduling information from the header station to one or more of the mobile communication units having identities known to the header station, the scheduling information being transmitted over the downlink wireless communication channel, the scheduling information including information for assigning to the known mobile communication units at least an order of transmission.

3. A method as set forth in claim 2 wherein the scheduling information further includes information for assigning a number of message units that are to be transmitted from each of the known mobile communication units in the assigned transmission order.

4. A method as set forth in claim 1 wherein the step of transmitting information over the uplink wireless communication channel includes a step of transmitting request information from one or more mobile communication units having an identity that is not known to the header station, the request information requesting the header station to include the unknown header station within a group of known mobile communication units that are associated with the header station.

5. A method as set forth in claim 1 wherein, during the uplink portion of the wireless communication cycle time period, the uplink information is transmitted in accordance with a Carrier Sense-Multiple Access method wherein mobile communication units that are known to the header station, and also mobile communication units that are unknown to the header station, contend for access to the uplink wireless communication channel.

6. A method as set forth in claim 1 wherein the step of transmitting information over the uplink wireless communication channel includes a step of receiving the transmitted uplink information with the header station, and also includes a further step of simultaneously rebroadcasting the received uplink information by transmitting the received uplink information over the downlink wireless communication channel.

7. A method as set forth in claim 1 wherein the step of transmitting information on the uplink wireless communication channel includes an initial step of:
transmitting scheduling information from the header station to one or more of the mobile communication units having identities known to the header station, the scheduling information being transmitted over the downlink wireless communication channel, the scheduling information including information for assigning to the known mobile communication units at least a predetermined order of transmission; and wherein the initial step is followed by a step of
transmitting information on the uplink wireless communication channel from scheduled mobile communication units in accordance with the predetermined order of transmission; followed by a step of for mobile communication units having a identity that is unknown to the header station, transmitting information on the uplink wireless communication channel in accordance with a Carrier Sense-Multiple Access method wherein the unknown mobile communication units contend for access to the uplink wireless communication channel.

8. A method as set forth in claim 1 wherein the header station transmits the Start signal in response to an enabling signal received from the wired network.

9. A method as set forth in claim 8 wherein the step of transmitting information over the downlink wireless communication channel includes a terminal step of transmitting the enabling signal from the header station to the wired network.

10. A method as set forth in claim 1 and including a step of periodically interrogating a selected one or ones of the mobile communication units to determine if the selected one or ones are actively disposed within the communication cell, the step of interrogating including the steps of transmitting a message over the downlink wireless communication channel, the message being addressed to the selected one or ones; and waiting for a predetermined interval of time for a response to be transmitted by the selected one or ones of the mobile communication units over the link wireless communication channel.

11. A method as set forth in claim 10 wherein, if during the step of waiting a response is not received from the selected one or ones of the mobile communication units, the method includes a step of transmitting information that is associated with a non-responding mobile communication unit from the header station to the wired network for storage within an archival unit that is also coupled to the wired network.

12. A method as set forth in claim 1 wherein the step of transmitting information over the uplink wireless communication channel includes an initial step of:
transmitting downlink polling information from the header station for polling specific ones of the mobile communication units to determine if the polled mobile communications units require the use of the uplink wireless communication channel; and, for a mobile unit so requiring the use of the uplink wireless communication channel
transmitting information, in response to the reception of the downlink polling information over the uplink wireless communication channel; and, for a mobile unit not requiring the use of the uplink wireless communication channel
inhibiting an uplink transmission for a period of time at least equal to a predetermined time out period.

13. A method as set forth in claim 1 wherein the step of transmitting information over the uplink wireless communication channel includes an initial step of:
transmitting downlink polling information from the header station for polling specific ones of the mobile communication units to determine if the polled mobile communications units require the use of the uplink wireless communication channel; and, for a mobile unit so requiring the use of the uplink wireless communication channel
transmitting information, in response to the reception of the downlink polling information, over the uplink wireless communication channel; and, for a mobile unit not requiring the use of the uplink wireless communication channel
transmitting a message over the uplink wireless communication channel to the header station, the message indicating that the mobile unit does not require the use of the uplink wireless communication channel.

14. A method as set forth in claim 3 wherein the message units are expressed in units of frames, bytes, slots, or time.

15. A method as set forth in claim 1 wherein the uplink portion of the wireless communication cycle time period precedes the downlink portion.

16. A method as set forth in claim 1 wherein the downlink portion of the wireless communication cycle time period precedes the uplink portion.

17. A method as set forth in claim 1 wherein the step of transmitting information over the uplink wireless communication channel includes a further step of receiving a positive acknowledgement from the header station, the positive acknowledgement acknowledging receipt of the information by the header station; and if the positive acknowledgement is not received, retransmitting the information over the uplink wireless communication channel.

18. A method as set forth in claim 1 wherein the step for transmitting information over the downlink wireless communication channel includes a further step of receiving a positive acknowledgement from a mobile communication unit, the positive acknowledgement acknowledging receipt of the information by the mobile communication unit; and if the positive acknowledgement is not received, retransmitting the information over the downlink wireless communication channel.

19. A communication system for communicating information bidirectionally between a wired network and a wireless network, comprising:
   at least one header station that is bidirectionally coupled to the wired network, the header station including means for receiving information from the wired network and for transmitting information to the wired network, the header station further including means for receiving uplink information from the wireless network and for transmitting downlink information to the wireless network, the downlink information including information received from the wired network, said header station further including means for transmitting control information to the wireless network for identifying a start and an end of a wireless communication cycle time period, the control information transmitted by the header station further including information for specifying an end of an uplink portion of the time period and a beginning of a downlink portion of the time period; and
   at least one mobile communication unit that includes means that is responsive to the control information for receiving downlink information from the header station over the wireless network and for transmitting uplink information to the header station over the wireless network.

20. A communication system as set forth in claim 19 wherein the control information includes a start of wireless communication cycle signal, and wherein the header station transmits the start of wireless communication signal in response to a reception of a wireless communication cycle enabling signal from the wired network.

21. A communication system as set forth in claim 20 wherein the control information further includes an end of wireless communication cycle signal, and wherein the header station transmits the communication cycle enabling signal to the wired network in response to transmitting the end of wireless communication cycle signal to the wireless network.

22. A communication system as set forth in claim 19 wherein the at least one mobile communication unit includes means for transmitting uplink information in accordance with a Carrier Sense-Multiple Access method, and wherein mobile communication units that are known to the header station, and also mobile communication units that are unknown to the header station, contend for access to an uplink wireless communication channel during the uplink portion of the time period.

23. A communication system as set forth in claim 19 wherein the at least one mobile communication unit includes means for transmitting uplink information in accordance with a Carrier Sense-Multiple Access method, wherein the control information includes a request signal for requesting unknown mobile communication units to identify themselves to the header station, and wherein mobile communication units that are unknown to the header station respond to the request signal by contending for access to an uplink wireless communication channel using the Carrier Sense-Multiple Access method.

24. A communication system as set forth in claim 19 wherein the downlink transmitting means of the header station, and the uplink transmitting means of the at least one mobile communication unit, each include means for transmitting infrared radiation, and wherein the uplink receiving means of the header station, and the downlink receiving means of the at least one mobile communication unit, each include means for receiving infrared radiation.

25. A communication system for communicating information bidirectionally between a wired network and a wireless network, comprising:
   at least one header station that is bidirectionally coupled to the wired network, the header station including means for receiving information from the wired network and for transmitting information to the wired network, the header station further including means for receiving uplink information from the wireless network and for transmitting downlink information to the wireless network, the downlink information including information received from the wired network, said header station further including means for transmitting control information to the wireless network for identifying a start and an end of a wireless communication cycle time period, the control information further including information for partitioning the wireless communication cycle time period into an uplink portion of the time period and into a downlink portion of the time period, said header station further including means for transmitting, to the wireless network, information representing a polling table, the polling table information including information for identifying one or more of the mobile communication units and information specifying a maximum amount of uplink information that each identified mobile communication unit is to transmit during the uplink portion of the wireless communication cycle time period; and
   at least one mobile communication unit that includes means that is responsive to the control information for receiving downlink information from the header station over the wireless network and for transmitting uplink information to the header station over the wireless network.

26. A communication system as set forth in claim 25 wherein each identified mobile unit is responsive to the polling table information for transmitting up to the maximum amount of uplink information, each identified mobile unit further being responsive to the polling table information for transmitting the uplink information in accordance with an order that the mobile communication units are specified in the polling table information.

27. A communication system for communicating information bidirectionally between a wired network and a wireless network, comprising:
   at least one header station that is bidirectionally coupled to the wired network, the header station including means for receiving information from the wired network and for transmitting information to the wired network, the header station further including means for receiving uplink information from the wireless network and for transmitting downlink information to the wireless network, the downlink information including information received from the wired network, said header station further including means for transmitting control information to the wireless network for identifying a start and an end of a wireless communication cycle time period, the control information further including information for partitioning the wireless communication cycle time period into an uplink portion of the time period and into a downlink portion of the time period;

at least one mobile communication unit that includes means that is responsive to the control information for receiving downlink information from the header station over the wireless network and for transmitting uplink information to the header station over the wireless network; and information storage means that is coupled to the wired network, and wherein the header station transmits information that is received from the wired network, and that cannot be transmitted to the wireless network, back to the wired network for storage in the information storage means.

* * * * *